United States Patent
Chen et al.

(10) Patent No.: US 9,996,586 B2
(45) Date of Patent: Jun. 12, 2018

(54) METHOD AND DEVICE FOR SEARCHING FOR CONTACT OBJECT, AND STORAGE MEDIUM

(71) Applicant: TENCENT TECHNOLOGY (SHENZHEN) COMPANY LIMITED, Shenzhen (Guangdong) (CN)

(72) Inventors: Xiaobo Chen, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 214 days.

(21) Appl. No.: 14/440,317

(22) PCT Filed: Mar. 21, 2014

(86) PCT No.: PCT/CN2014/073830
§ 371 (c)(1),
(2) Date: May 1, 2015

(87) PCT Pub. No.: WO2014/190795
PCT Pub. Date: Dec. 4, 2014

(65) Prior Publication Data
US 2015/0293975 A1     Oct. 15, 2015

(30) Foreign Application Priority Data

May 30, 2013    (CN) .......................... 2013 1 0209938

(51) Int. Cl.
*G06F 17/30*    (2006.01)

(52) U.S. Cl.
CPC .. *G06F 17/30522* (2013.01); *G06F 17/30439* (2013.01); *G06F 17/30637* (2013.01); *G06F 17/30985* (2013.01); *G06F 17/30988* (2013.01)

(58) Field of Classification Search
CPC ......... G06F 17/30439; G06F 17/30522; G06F 17/30637; G06F 17/30985; G06F 17/30988
See application file for complete search history.

(56) References Cited

U.S. PATENT DOCUMENTS

2002/0045463 A1*   4/2002   Chen ...................... G06F 3/018
                                                                   455/566
2005/0209844 A1*   9/2005   Wu ..................... G06F 17/2223
                                                                      704/2

(Continued)

FOREIGN PATENT DOCUMENTS

CN         101753476 A      6/2010
CN         101888427 A     11/2010

(Continued)

OTHER PUBLICATIONS

International Search Report issued in PCT/CN2014/073830, completed Jun. 6, 2014, 3 pages.

(Continued)

*Primary Examiner* — Dinku Gebresenbet
(74) *Attorney, Agent, or Firm* — Anova Law Group, PLLC (57) ABSTRACT

The present disclosure relates to the searching technology field, and discloses a method and a device for searching a contact object, and a storage medium. The method comprises: normalizing a content of a contact field; receiving an input string for contact object searching, wherein the input string comprises any character or a combination of characters; normalizing the input string; searching in the normalized content of the contact field according to the normalized input string to obtain a matching field; and acquiring information of a contact object containing the matching field as a contact searching result. The device comprises a preprocessing module, a receiving module, an input processing module, a searching module and an acquiring module.

17 Claims, 5 Drawing Sheets

(56) References Cited

U.S. PATENT DOCUMENTS

2005/0288006 A1    12/2005  Apfel
2007/0028168 A1*    2/2007  Robbins .............. G06F 17/2223
                                                       715/210
2012/0257741 A1*   10/2012  Gudlavenkatasiva ....................
                                                       H04M 3/229
                                                       379/218.01

FOREIGN PATENT DOCUMENTS

| CN | 102298582 A  | 12/2011 |
| CN | 102521329 A  |  6/2012 |
| CN | 102542000 A  |  7/2012 |
| CN | 102710854 A  | 10/2012 |
| CN | 102883020 A  |  1/2013 |
| WO | 2014190795 A1| 12/2014 |

OTHER PUBLICATIONS

The State Intellectual Property Office of the People's Republic of China (SIPO) Office Action 1 for 201310209938.X dated Jul. 21, 2016 13 Pages (including translation).

The State Intellectual Property Office of the People's Republic of China (SIPO) Office Action 2 for 201310209938.X dated Mar. 6, 2017 10 Pages (including translation).

* cited by examiner

METHOD AND DEVICE FOR SEARCHING FOR CONTACT OBJECT, AND STORAGE MEDIUM

CROSS-REFERENCE TO RELATED APPLICATION

This application is a national phase application of PCT Application No. PCT/CN2014/073830, internationally filed Mar. 21, 2014, which claims priority to Chinese Patent Application No. 201310209938.X, filed on May 30, 2013, both of which are incorporated herein by reference in their entirety.

FIELD OF THE INVENTION

The present disclosure relates to the field of searching technologies, and in particular, to a method and a device for searching for a contact object, and a storage medium.

BACKGROUND OF THE INVENTION

Most mobile terminals support the management of a contact list, for example, adding, deleting and querying a contact object. Generally, the information of a contact object in the contact list includes a plurality of fields such as phone number, name, company, occupation, residence address, mail address and memorandum. At present, the function of contact object querying provided by the mobile terminals is rather simple, and mostly, the mobile terminals only support searching based on the phone number field or the name field. In the case of the iPhone Operating System (iOS) developed by Apple Inc., for example, the contact list application of iOS supports a full-match search for phone numbers, and a full pinyin-based search for a Chinese name.

Because it is usually difficult to recite the phone number of a contact object and it is time consuming to input pinyins (i.e. Chinese phonetic alphabets, or phonetic spelling) for Chinese characters, it is complicated and inconvenient to search for a contact object on the mobile terminal.

SUMMARY OF THE INVENTION

In order to solve the problem that the contact searching operation is rather fussy and inconvenient, embodiments of the disclosure provide a method and a device for searching a contact, and a storage medium. The technical solutions are as follows:

In a first aspect, embodiments of the disclosure provide a method for searching a contact. The method includes:
  normalizing the content of a contact field;
  receiving an input string for searching a contact, where the input string comprises any character or a combination of characters;
  normalizing the input string;
  searching in the normalized content of the contact field according to the normalized input string, to obtain a matching field; and
  acquiring information of a contact object containing the matching field as a contact searching result.

In a second aspect, embodiments of the disclosure provide a device for searching a contact. The device includes:
  a preprocessing module, configured to normalize a content of a contact field;
  a receiving module, configured to receive an input string for contact object searching, where the input string comprises any character or a combination of characters;
  an input processing module, configured to normalize the input string;
  a searching module, configured to search in the normalized content of the contact field according to the normalized input string, to obtain a matching field; and
  an acquiring module, configured to acquire information of a contact object containing the matching field as a contact searching result.

In a third aspect, embodiments of the disclosure provide a storage medium containing computer-executable instructions which are adapted to perform a method for searching a contact. The method includes steps of:
  normalizing the content of a contact field;
  receiving an input string for searching a contact, wherein the input string comprises any character or a combination of characters;
  normalizing the input string;
  searching in the normalized content of the contact field according to the normalized input string, to obtain a matching field; and
  acquiring information of a contact object containing the matching field as a contact searching result.

In embodiments of the disclosure, contents of contact fields are normalized. After an input string for contact object searching is received and normalized, the normalized contents of the contact fields are searched for the normalized input string to obtain a matching field. The information of a contact object containing the matching field is acquired as the contact searching result, so that search information of the target contact object is implemented. The input string may comprise any character or a combination of characters and a matching field can be further obtained according to the input string, and subsequently the information of the corresponding contact object may be acquired via the matching field, therefore, the fussy and inconvenient operation of searching for a contact object is effectively avoided. The searching process is simplified for flexibility, and the target contact object can be exactly located.

BRIEF DESCRIPTION OF THE DRAWINGS

In order to more clearly illustrate technical solutions of embodiments of the disclosure, the drawings used for the description of embodiments will be briefly introduced below. However, drawings used for the description below illustrate only some embodiments of the disclosure, and modifications and substitutions may be further made on these drawings by those skilled in the art without creative work.

DETAILED DESCRIPTION OF THE EMBODIMENTS

In order to make technical solutions and advantages of the disclosure more apparent, embodiments of the disclosure will be further described in detail below in conjunction with drawings.

Figure 1:
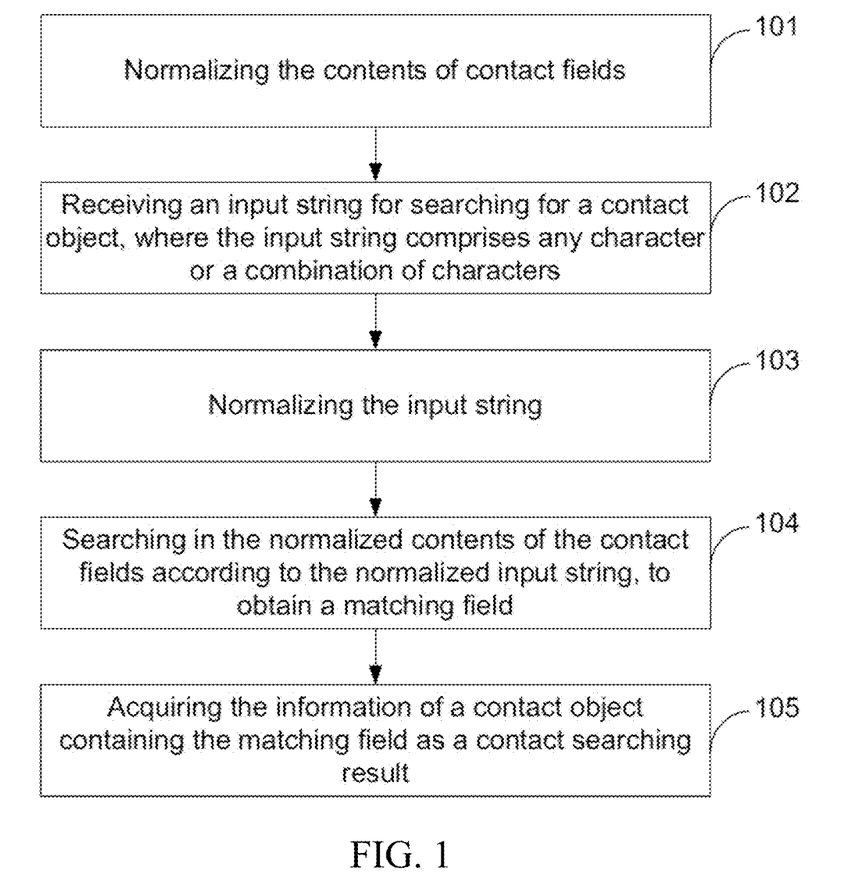
FIG. 1 is a flow chart of a method for searching for a contact object according to embodiments of the disclosure.

Referring to FIG. 1, embodiments provide a method for searching for a contact object. The method includes the following steps 101-105:

Step 101: normalizing the contents of contact fields;

Step 102: receiving an input string for contact object searching, where the input string comprises any character or a combination of characters;

Step 103: normalizing the input string;

Step 104: searching in the normalized contents of the contact fields according to the normalized input string, to obtain a matching field; and Step 105: acquiring the information of a contact object containing the matching field as a contact searching result.

Herein, the normalizing refers to classifying and converting each character in the string according to the type of the character. That is to convert the character in the string into a character that conforms to a given rule.

Based on the above method, in some embodiments, searching in the normalized contents of the contact fields according to the normalized input string to obtain a matching field includes:

searching throughout the normalized contents of the contact fields by using the normalized input string as an index, to find a matching field that conforms to a preset match rule.

Herein, the preset match rule includes at least one of a continuous match rule and a non-continuous match rule.

Based on the above method, in some embodiments, after acquiring the information of a contact object containing the matching field as the contact searching result, the method further includes:

when the contact searching result includes a plurality of contact objects, calculating a matching degree between each contact object in the contact searching result and the input string according to the related information of the matching field; and sorting the contact objects in the contact searching result according to the calculated matching degrees, and displaying the information of the sorted contact objects.

In some embodiments, the calculating a matching degree between each contact object in the contact searching result and the input string according to the related information of the matching field includes:

acquiring the matching field of each contact object in the contact searching result, and acquiring at least one of a matching location, a matching length and a match rule of the matching field;

determining a corresponding weighting factor for each parameter acquired, i.e. each of the acquired matching field and the acquired at least one of the matching location, the matching length and the match rule of the matching field; and calculating a matching degree between the contact object and the input string according to the parameter acquired and the corresponding weighting factor.

Based on the above method, in some embodiments, normalizing the content of a contact field includes:

performing a Chinese character conversion processing on the content of the contact field, where if the content includes at least one Chinese character, the Chinese character conversion processing includes converting the Chinese character into the corresponding pinyin, and inserting a space between every two adjacent pinyins as well as between the pinyin and a character other than the pinyin;

uniformizing the alphabets in the content obtained from the Chinese character conversion processing to a lowercase or uppercase format, with characters other than the alphabets being unchanged, to obtain a first string; and mapping the alphabets in the first string to digits according to a designated mapping relation, with characters in the first string other than the alphabets being unchanged, to obtain a second string.

The first string and the second string are both obtained from the normalization of the content of the contact field. The designated mapping relation is a mapping relation between alphabets and digits on a digit keyboard or a dialing keyboard.

Based on the above method, in some embodiments, normalizing the input string includes:

performing a Chinese character conversion processing on the input string, where if the input string includes at least one Chinese character, the Chinese character conversion processing includes:

converting the Chinese character into the corresponding pinyin, and inserting a space between every two adjacent pinyins and between the pinyin and a character other than the pinyin; and uniformizing the alphabets in the input string obtained from the Chinese character conversion processing to a lowercase or uppercase format, with characters other than the alphabets being unchanged.

The above method, according to embodiments described in the disclosure, may be performed by a terminal, which may include a storage device, a processor and a display. A software program for performing the above method is stored on the storage device. After the software program is executed by the processor, an interface providing the searching result is shown on the display. In some embodiments, the terminal is a mobile terminal, which includes, but is not limited to: a mobile phone, a tablet computer and the like.

In the above method, according to embodiments described in the disclosure, the contents of contact fields are normalized after an input string for contact object searching is received and normalized, the normalized contents of the contact fields are searched for the normalized input string to obtain a matching field. The information of a contact object containing the matching field is acquired as the contact searching result, so that the searching for information of the target contact object is implemented. The input string may comprise any character or a combination of characters and a matching field can be further obtained according to the input string, and subsequently the information of the corresponding contact object may be acquired via the matching field, therefore, the fussy and inconvenient operation of searching for a contact object is effectively avoided, the searching process is simplified for flexibility, and the target contact object can be exactly located.

Figure 2:
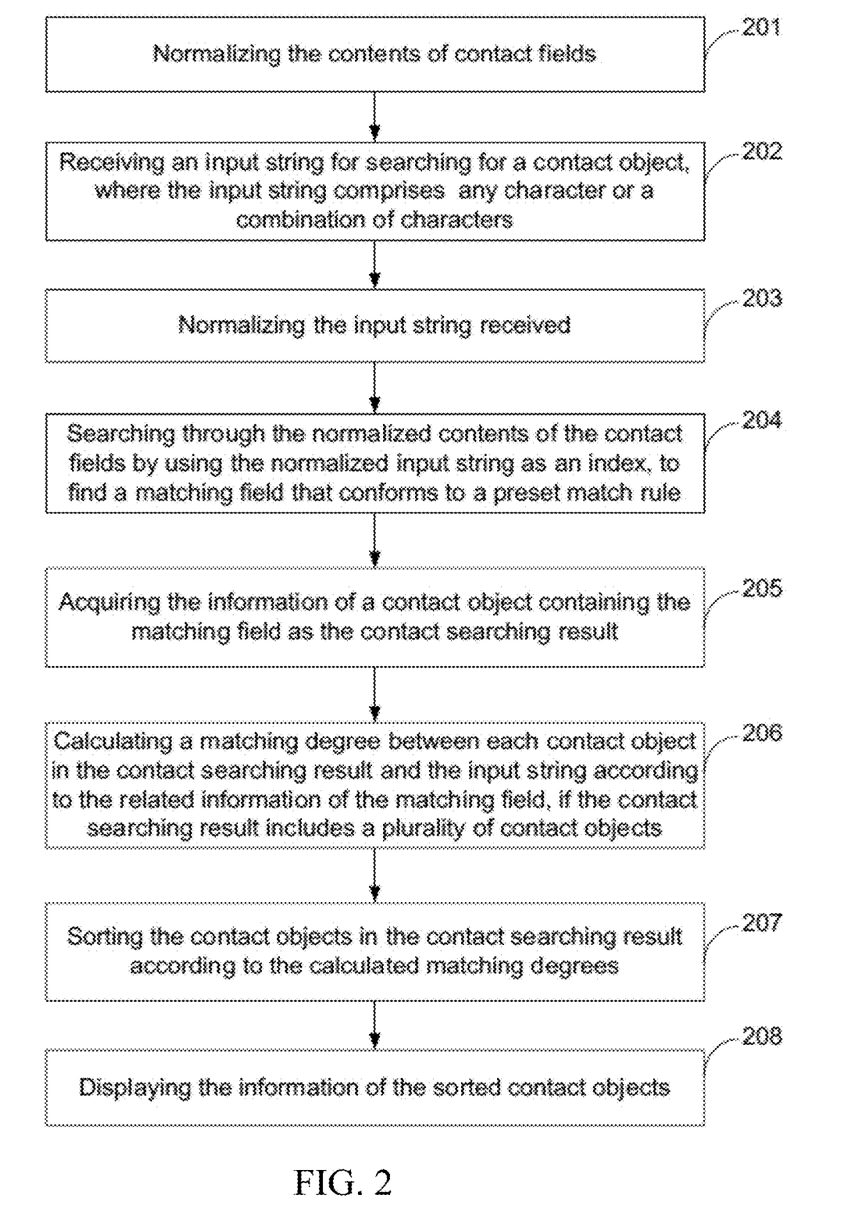
FIG. 2 is a flow chart of a method for searching for a contact object according to embodiments of the disclosure.

Referring to FIG. 2, embodiments of the disclosure provide a method for searching for a contact object. The method may still be performed by the terminal containing a storage device, a processor and a display according to the first embodiment. The method includes Steps 201-208 below.

Step 201: normalizing the contents of contact fields.

In some embodiments, the normalizing refers to classifying and converting each character in the string according to the type of the character, i.e., converting the character in the string into a character that conforms to a given rule.

In some embodiments, there are usually a plurality of the contact fields, which include, but are not limited to: name, mobile phone number, landline phone number, occupation, company, communication address, mailbox, home page, etc., but it is not specifically limited in the invention. The content of the contact field refers to the content saved in the field. For example, a content of Wang Qiang is saved in the name field, and a content of 13901012345 is saved in the mobile phone number field, and so on. Generally, the information of a contact object includes at least one contact field, and typically includes two fields, i.e., a name field and a phone number field. Usually, the information of the contact object is saved in a contact list of the mobile terminal, but it is not specifically limited in the invention.

Specifically, Step 201 may include multiple sub-steps.

One sub-step includes performing a Chinese character conversion processing on the content of the contact field, where if the content includes at least one Chinese character, the Chinese character conversion processing includes: converting the Chinese character into the corresponding pinyin, and inserting a space between every two adjacent pinyins and between the pinyin and a character other than the pinyin.

One sub-step includes uniformizing the alphabets in the content obtained from the Chinese character conversion processing to a lowercase or uppercase format, with characters other than the alphabets being unchanged, to obtain a first string.

One sub-step includes mapping the alphabets in the first string to digits according to a designated mapping relation, with characters other than the alphabets being unchanged, to obtain a second string.

The first string and the second string are both obtained from the normalization of the content of the contact field. The designated mapping relation is a mapping relation between alphabets and digits on a digit keyboard or a dialing keyboard.

Considering that the contents of a contact object in the contact list contain mostly lowercase alphabets, it is preferable to uniformize the alphabets in the content obtained from the Chinese character conversion processing to the lowercase format, so that the speed and efficiency of the normalization can be further improved and the processing time can be further saved.

In the above step, two normalized strings, i.e., the first string and the second string, will be obtained for any contact field. The first string may include alphabets, digits and special symbols, while the second string may include digits and special symbols but not any alphabet. The second string is obtained from the further normalization of the first string, for using in an application scene where the user wishes to search for a contact object when a dialing interface has already been opened. At this time, an input string, which functions as a search key word, is inputted via a digit keyboard or a dialing keyboard. The user can input digits but not alphabets in this case, thus the user inputs digits instead of the corresponding alphabets for the purpose of the searching. For example, the user presses a digit combination "94" instead of an alphabet combination "wg" in order to searching for a contact object (for example, WANG Gang) matching the alphabet combination. In such a scene, with the second string obtained by the normalizing, it is possible to search for a contact object conforming to the searching condition according to the corresponding alphabets, even if the user inputs digits merely, so that no specific limitation will be imposed on which keyboard is used by the user and what characters are inputted. Therefore, the flexibility is greatly improved and the operation is easier and simpler.

Additionally, it should be noted that, in the case of a polyphonic Chinese character, each of pinyins of the Chinese character is obtained from converting the Chinese character into the pinyin. For example, for the Chinese character 乐, two pinyins, i.e., le and yue, are obtained from the conversion.

A specific example will be given for illustration below. For example, if the name field of one contact object from the contact list of the mobile terminal has a content of a string 小何 Mr., then the normalizing process on the string is as follows:

Chinese characters in the string 小何 Mr. are converted into pinyins corresponding to the Chinese characters, and a space is added between adjacent pinyins as well as between a pinyin and another character. A string xiao he Mr. is obtained. Next, all the uppercase alphabets in the string Xiao he Mr. are converted into lowercase alphabets, with the remaining characters other than the alphabets being unchanged, so that a normalized first string xiao he mr. is obtained.

Further, based on the above first string, the alphabets in the first string xiao he mr. are mapped as digits according to a designated mapping relation, with the remaining characters being unchanged, so that a second string 9426 43 67. is obtained.

In some embodiments, the digit keyboard refers to the keyboard of a mobile terminal with a non-touch screen, and is usually located on the housing of the mobile terminal explicitly, or on a shell that is seen covered by the screen of the mobile terminal. The dialing keyboard refers to a keyboard displayed on an interface of a mobile terminal with a touch screen and is used for dialing by a user. Both the digit keyboard and the dialing keyboard include 10 digit keys for digits 0-9, and may generally further include a * key and a # key. In addition to the digit keyboard and the dialing keyboard, a full keyboard including the 26 English alphabet letters and some special symbols may be arranged on some mobile terminals.

Figure 3:
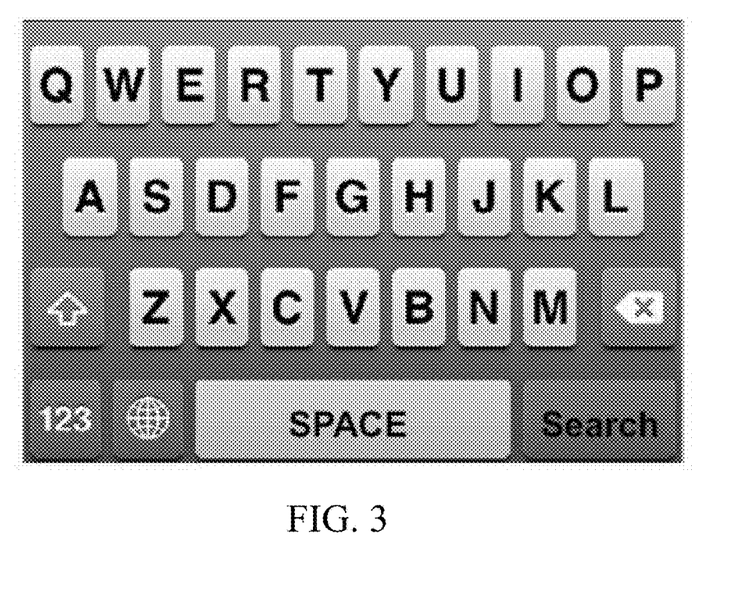
FIG. 3 is a schematic view of a full keyboard of a mobile terminal with a touch screen according to embodiments of the disclosure.
Figure 4:
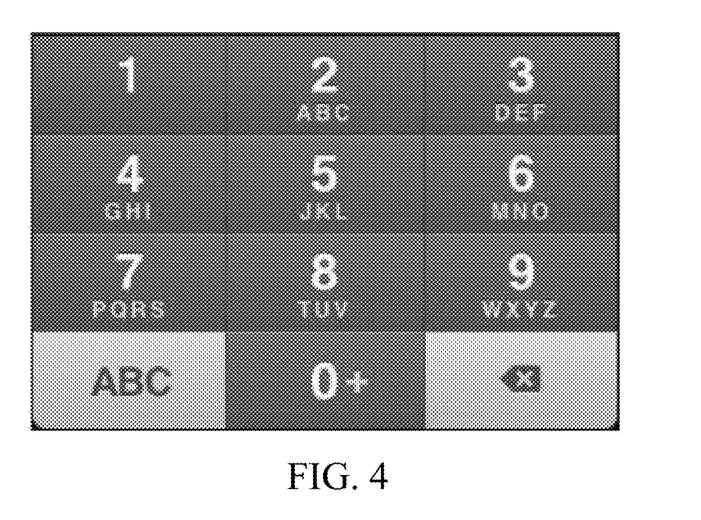
FIG. 4 is a schematic view of a dialing keyboard of a mobile terminal with a touch screen according to embodiments of the disclosure.

FIG. 3 shows a schematic view of a full keyboard for a mobile terminal with a touch screen, where the full keyboard includes the 26 English alphabet letters. FIG. 4 shows a schematic view of a dialing keyboard for a mobile terminal with a touch screen. The dialing keyboard includes 10 digit keys for digits 0-9. Each of the digits 2-9 is accompanied by corresponding alphabets on the digit key.

In some embodiments, the designated mapping relation may be as follows.

The digit 2 corresponds to alphabets ABC. The digit 3 corresponds to alphabets DEF. The digit 4 corresponds to alphabets GHI. The digit 5 corresponds to alphabets JKL. The digit 6 corresponds to alphabets MNO. The digit 7 corresponds to alphabets PQRS. The digit 8 corresponds to alphabets TUV. The digit 9 corresponds to alphabets WXYZ. The above mapping relations may be stored in a generated mapping table, so that the conversion between a pinyin and a digit may be accomplished by looking up the mapping table during the normalizing.

Step 202: receiving an input string for contact object searching, where the input string comprises any character or a combination of characters.

In some embodiments, the type of a character in the input string is not limited, and the user is allowed to input any character or a combination of characters. The character combination includes, but is not limited to: a Chinese character, an alphabet, a digit, a special symbol and the like.

In some embodiments, no limitation is imposed on the input mode of the input string, that is, the input string may be inputted via a digit keyboard or a dialing keyboard, or via a full keyboard, or via a handwriting mode, and it is not specifically limited in the invention.

Step 203: normalizing the input string received.

Step 203 may include multiple sub-steps.

One sub-step includes performing a Chinese character conversion processing on the input string. If the input string includes at least one Chinese character, the Chinese character conversion processing includes: converting the Chinese character into the corresponding pinyin, and inserting a space between every two adjacent pinyins as well as between the pinyin and a character other than the pinyin. One sub-step includes uniformizing the alphabets in the input string after the Chinese character conversion processing to a lowercase or uppercase format, with characters other than the alphabets being unchanged.

The input string after the above normalization forms a key word used for searching for a matching contact object.

Step 204: searching throughout the normalized contents of the contact fields by using the normalized input string as an index, to find a matching field that conforms to a preset match rule.

Herein, the preset match rule includes at least one of a continuous match rule and a non-continuous match rule.

The continuous match rule is suitable to a case in which a continuous character string, which is the same as the normalized input string, exists in the normalized content of the contact field. For example, if the normalized content of the company field is a string abcdxyz, and the normalized input string is cdx, then the company field is matched according to a result of the matching between the normalized content and the normalized input string. Other related information including, but not limited to, a matching location of 3 and a matching length of 3, may be further obtained, resulting in the continuous matching.

The non-continuous match rule is suitable to a case in which non-continuous characters, which, if combined sequentially, are the same as the normalized input string, exist in the normalized content of the contact field. For example, if the normalized content of the name field is a string xiao he liu, and the normalized input string is xh, then a result of the matching between the normalized content and the normalized input string includes that: the name field is matched at a matching location of 1 with a matching length of 1, resulting in the non-continuous matching; and the name field is matched at a matching location of 6 with a matching length of 1, resulting the non-continuous matching.

In some embodiments, the continuous match rule may include: a pinyin full-match rule, a digit full-match rule, etc. The non-continuous match rule may include: a pinyin leading-alphabet match rule, etc., which is not specifically limited in the disclosure.

The matching location refers to the location of the matching character in the normalized content of the contact field. The matching length refers to the length of the current matching character.

In embodiments of the disclosure, the match rules may be used individually or in combination as desired. An illustrative scene in which the match rules are used in combination will be given below. For example, it is determined whether the input string comprises a single digit or combined digits inputted in a dialing state. If the input string comprises a single digit or combined digits inputted in the dialing state, the digit full-match rule is used when the first digit of the input string is 1 or 0, and the pinyin leading-alphabet match rule is used when the first digit of the input string is any one of the digit 2 to 9. If the input string does not comprise a single digit or combined digits inputted in the dialing state, the pinyin full-match rule or the pinyin leading-alphabet match rule is used.

Step 205: acquiring the information of a contact object containing the matching field as the contact searching result.

Specifically, the obtained contact searching result may be recorded in a table. Specific illustration will be given below by referring to Table 1.

TABLE 1

| Contact object | Field 1 | Field 2 | ... | Field m | Matching Field and Match rule | Matching Location and Matching Length |
| --- | --- | --- | --- | --- | --- | --- |
| P1 | R11 | R12 | ... | R1m | S1 and T1 | K1 and L1 |
| P2 | R21 | R22 | ... | R2m | S2 and T2 | K2 and L2 |
| ... | ... | ... | ... | ... | ... | ... |
| Pn | Rn1 | Rn2 | ... | Rnm | Sn and Tn | Kn and Ln |

Fields of the contact objects and the matching results are recorded in the above Table 1. There are n contact objects denoted by P1 to Pn. Each contact object is provided with m fields, i.e. Field 1 to Field m. Each of the fields contains contents of R11, R12, ..., R1m; R21, R22, ..., R2m; ...; and Rn1, Rn2, ..., Rnm, etc., respectively. The n×m strings are searched one by one during the throughout searching process, in an order from left to right or from top to bottom, or in any other order, which is not specifically limited in the invention. The matching field and match rule, as well as the matching location and matching length, are further recorded in Table 1. For example, S1 represents the Field 1, T1 represents the pinyin full-match rule, K1 denotes 2, and L1 denotes 3, and so on. The above Table 1 is provided illustratively, which is not limited in the present invention, and no further illustration will be given herein.

During the matching and searching process, the searching process may be conducted in a way of gradually narrowing the search range. For example, if the current input string is composed of A, the normalized input string is composed of a. In this case, each of the contact objects P1-Pn in the above Table 1 is searched throughout, the search key word a (i.e. the input string a) is compared with each of the fields 1-m of the contact object in sequence. Information conforming to the match rule, for example, the matching field, the match rule, the matching location and the matching length, is recorded. If the user further inputs a character B without deleting the input string A, a string ab is obtained from the normalization; at this time, the character b is further compared with the contact objects matching with the search key word a, to obtain a final searching result, so that the range of the contact objects to be compared may be narrowed to avoid meaningless searching, the search time may be saved, and the search efficiency may be improved.

Step 206: calculating a matching degree between each contact object in the contact searching result and the input string according to the related information of the matching field, if the contact searching result includes a plurality of contact objects.

Calculating a matching degree between each contact object in the contact searching result and the input string according to the related information of the matching field includes:

acquiring the matching field of each contact object in the contact searching result, and acquiring parameters including at least one of a matching location, a matching length and a match rule of the matching field;

determining a corresponding weighting factor for each parameter acquired, i.e. each of the acquired matching field and the acquired at least one of the matching location, the matching length and the match rule of the matching field; and calculating a matching degree between the contact object and the input string according to the parameter acquired and the corresponding weighting factor.

Step 207: sorting the contact objects in the contact searching result according to the calculated matching degrees.

In some embodiments, the contact objects in the contact searching result may be sorted as per the matching degrees of the contact objects in an order from high to low, to guarantee that a contact object with a high matching degree is displayed in a superior position when the contact searching result is displayed, to enable the user to find the intended contact object conveniently and quickly.

In this case, a contact object with a high matching degree is arranged in front of a contact object with a low matching degree. Further, a plurality of contacts having the same matching degree may be sorted according to the alphabetic sequence of the name fields of the contact objects.

The weighting factor may be preset as required, and is usually determined according to the importance, which depends on the specific application scene. For example, the weighting factor for the name field may be set as 1.0, the weighting factor for the phone number field may be set as 0.8, and so on. The weighting factor for the pinyin leading-alphabet match rule may be set as 1.0, the weighting factor for the pinyin full-match rule may be set as 0.8, and so on. This is not specifically limited in the disclosure.

Step 208: displaying the information of the sorted contact objects.

The information of the sorted contact objects may be displayed in a list on the interface. The content of the matching field in the information of each contact object may be marked in a specified manner, which includes, but is not limited to at least one of: enlarged display, highlighted display in the specified colour, display in a bold form, italic display, etc., which is not specifically limited in the disclosure.

The sorted contact objects in the contact searching result are displayed in the list on the interface, and the specific matching characters and the matching locations of the contact objects are marked with a special colour, so that the specific matching information may be viewed more conveniently and visually.

Figure 5A:
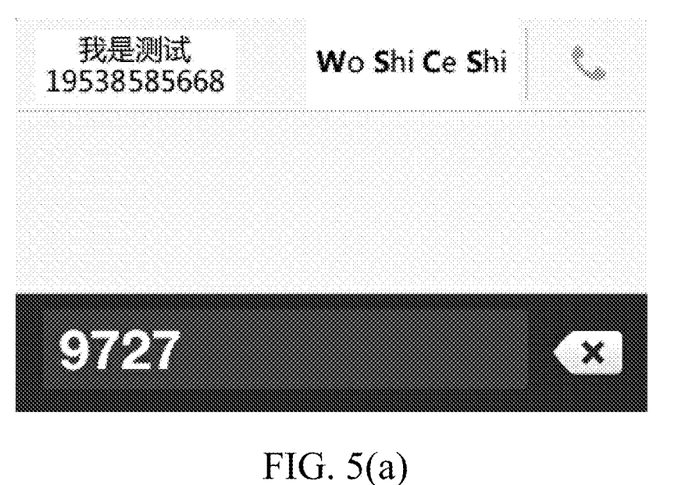
FIG. 5(a) and FIG. 5(b) are schematic views showing interfaces displaying searching results according to embodiments of the disclosure.
Figure 5B:
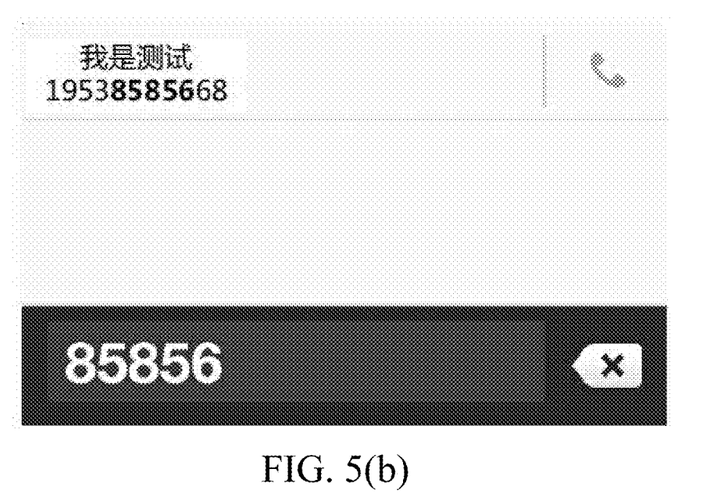

Referring to FIG. 5(*a*) and FIG. 5(*b*), for example, schematic diagrams showing two searching results are shown. In FIG. 5(*a*), the input string comprises digits 9727 that are inputted by a user via a dialing keyboard, and a name field, which has a content of 我是测试, of a contact object is obtained by searching based on the pinyin leading-alphabet match rule. In this case, the phone number of the contact object is displayed under the name field. A pinyin string Wo Shi Ce Shi corresponding to the content of the name field of the contact object is displayed on the right. The matching characters WSCS correspond to the digits 9727 according to the mapping relation of the dialing keyboard. The matching characters are displayed in a bold form for a high-lighting effect to facilitate users to view the search result. In FIG. 5(*b*), the input string comprises digits 85856, and a contact object with a name field having a content of 我是测试 is obtained by searching based on the digit full-match rule. The phone number 19538585668 of the contact object is displayed under the name field. The matching digits 85856 are displayed in a bold form for a high-lighting effect to facilitate users to view the searching result.

Additionally, the number of contacts to be displayed may be designated. When excessive contact objects are involved in the searching result, in some embodiments, the designated number of sorted contact objects at the superior positions are displayed, with contact objects with a low matching degree being filtered out, to provide a more accurate searching result for the user.

In the above method, according to embodiments described in the disclosure, the contents of contact fields are normalized; after an input string for contact object searching is received and normalized, the normalized contents of the contact fields are searched for the normalized input string to obtain a matching field. The information of a contact object containing the matching field is acquired as the contact searching result, so that the searching for information of the target contact object is implemented. Because the input string may comprise any character or a combination of characters and a matching field can be further obtained according to the input string, and subsequently the information of the corresponding contact object may be acquired via the matching field, the fussy and inconvenient operation of searching for a contact object is effectively avoided, the searching process is simplified for flexibility, and the target contact object can be exactly located.

Figure 6:
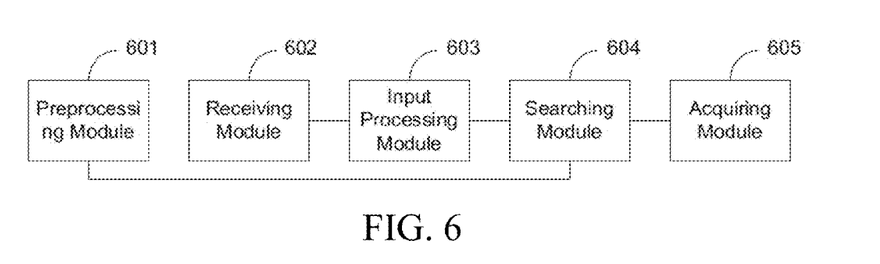
FIG. 6 is a structural view of a device for searching for a contact object according to embodiments of the disclosure.

Referring to FIG. 6, embodiments described in the disclosure provide a device for searching for a contact object. The device includes:

a preprocessing module 601, configured to normalize the content of a contact field;

a receiving module 602, configured to receive an input string contact object searching, where the input string comprises any character or a combination of characters;

an input processing module 603, configured to normalize the input string;

a searching module 604, configured to search in the normalized content of the contact field according to the normalized input string, to obtain a matching field; and an acquiring module 605, configured to acquire the information of a contact object containing the matching field as a contact searching result.

The above normalizing refers to classifying and converting each character in the string according the type of the character, i.e., converting the character in the string into a character that conforms to a given rule.

Based on the above method, in some embodiments, the searching module 604 is configured to:

search throughout the normalized contents of the contact fields by using the normalized input string as an index, to find a matching field that conforms to a preset match rule.

Herein, the preset match rule includes at least one of a continuous match rule and a non-continuous match rule.

Based on the above method, in some embodiments, the device further includes:

a sorting module, configured to calculate a matching degree between each contact object in the contact searching result and the input string according to the related information of the matching field, and sort the contact objects in the contact searching result according to the calculated matching degrees, after the acquiring module acquire the contact searching result, if the contact searching result includes a plurality of contact objects; and a displaying module, configured to display the information of the contact objects sorted by the sorting module.

Based on the above, in some embodiments, the sorting module is configured to:

acquire the matching field of each contact object in the contact searching result, and acquire parameters including at least one of a matching location, a matching length and a match rule of the matching field;

determine a corresponding weighting factor for each parameter acquired, i.e. each of the acquired matching field and the acquired at least one of the matching location, the matching length and the match rule of the matching field; and calculate a matching degree between the contact object and the input string according to the parameter acquired and the corresponding weighting factor.

Based on the above method, in some embodiments, the preprocessing module 601 is configured to:

perform a Chinese character conversion processing on the content of the contact field, where, if the content includes at least one Chinese character, the Chinese character conversion processing includes: convert the Chinese character into the corresponding pinyin, and insert a space between every two adjacent pinyins and between the pinyin and a character other than the pinyin;

uniformize the alphabets in the content obtained from the Chinese character conversion processing to a lowercase or uppercase format, with characters other than the alphabets being unchanged, to obtain a first string; and map the alphabets in the first string to digits according to a designated mapping relation, with characters in the first string other than the alphabets being unchanged, to obtain a second string.

The first string and the second string are both obtained from the normalization of the content of the contact field, and the designated mapping relation is a mapping relation between alphabets and digits on a digit keyboard or a dialing keyboard.

Based on the above method, in some embodiments, the input processing module 603 is configured to:

perform a Chinese character conversion processing on the input string, where, if the input string includes at least one Chinese character, the Chinese character conversion processing includes: convert the Chinese character into the corresponding pinyin, and insert a space between every two adjacent pinyins and between the pinyin and a character other than the pinyin; and uniformize the alphabets in the input string after the Chinese character conversion processing to a lowercase or uppercase format, with the remaining characters other than the alphabets being unchanged.

The above device, according to embodiments described in the disclosure, may be configured to embody the method provided in any one of the above method embodiments. Reference may be made to the method embodiments for details, which will not be described again here. The above device may be applied to a mobile terminal, which includes, but is not limited to: a mobile phone, a tablet computer and the like.

In the above device, according to embodiments described in the disclosure, the contents of contact fields are normalized. After an input string for contact object searching is received and normalized, the normalized contents of the contact fields are searched for the normalized input string to obtain a matching field. The information of a contact object containing the matching field is acquired as the contact searching result, so that the searching for information of the target contact object is implemented. Because the input string may comprise any character or a combination of characters and a matching field can be further obtained according to the input string, and subsequently the information of the corresponding contact object may be acquired via the matching field, the fussy and inconvenient operation of searching for a contact object is effectively avoided, the searching process is simplified for flexibility, and the target contact object can be exactly located.

Additionally, embodiments of the disclosure provide a storage medium containing computer-executable instructions adapted to perform a method for searching for a contact object. The method includes steps of:

normalizing the content of a contact field;

receiving an input string for contact object searching, where the input string comprises any character or a combination of characters;

normalizing the input string;

searching in the normalized content of the contact field according to the normalized input string, to obtain a matching field; and acquiring the information of a contact object containing the matching field as a contact searching result.

It may be understood by one of ordinary skills in the art that all or a part of the steps for realizing the above embodiments may be accomplished via hardware, or may be accomplished by instructing related hardware by a software program, which may be stored in a computer-readable storage medium. The computer-readable storage medium may be a read-only storage device, a magnetic disc, a compact disc, etc.

The above description only shows some embodiments of the disclosure, rather than limiting the scope of the disclosure. All modifications, equivalent substitutions, improvements, etc., made without departing from the concept and principles of the disclosure should fall within the protection scope of the disclosure.

What is claimed is:

1. A method for searching for a contact object, comprising:

normalizing, by a terminal comprising at least a processor and a memory, contents of contact fields contained in contact objects stored in the memory of the terminal;

receiving an input string for contact object searching from a user interface displayed by the terminal;

normalizing the input string;

searching in the normalized contents of the contact fields according to the normalized input string, to obtain a matching field;

acquiring information of a contact object containing the matching field as a contact searching result; and displaying, by the processor, the input string and the contact searching result on the user interface;

wherein normalizing contents of contact fields further comprises: for a first contact field, obtaining a first string corresponding to a content of the first contact field, the first string being formed by characters contained in a full keyboard, wherein the first string includes multiple alphabet characters;

obtaining a second string corresponding to the same content of the first contact field by mapping alphabet characters in the first string to digits according to a designated mapping relation, wherein the designated mapping relation assigns each alphabet character with a single corresponding digit the second string includes multiple digits corresponding to the multiple alphabet characters; and when the first string further includes a non-alphabet character, the non-alphabet character is unchanged in the second string; and incorporating both the first string and the second string into the normalized contents of the contact fields as corresponding strings for the first contact field, wherein searching in the normalized contents of the contact fields according to the normalized input string further comprises:

respectively matching the first string and the second string with the normalized input string; and when either one of the first string or the second string matches with the normalized input string, determining the first content field as the matching field, such that the first content field can be matched regardless of whether a user input is a digit combination or an alphabet combination.

2. The method according to claim 1, wherein, the searching in the normalized contents of the contact fields according to the normalized input string to obtain a matching field comprises:

searching throughout the normalized contents of the contact fields by using the normalized input string as an index, to find a matching field that conforms to a preset match rule;

wherein, the preset match rule includes at least one of a continuous match rule and a non-continuous match rule, and the non-continuous match rule includes a rule for matching the normalized input string with leading-alphabets of character sets in the first string, the character sets being separated by one or more spaces.

3. The method according to claim 1, wherein, after acquiring information of a contact object containing the matching field as a contact searching result, the method further comprises:

calculating a matching degree between each contact object in the contact searching result and the input string according to related information of the matching field, if the contact searching result includes a plurality of contact objects; and sorting the contact objects in the contact searching result according to the calculated matching degrees, and displaying the information of the sorted contact objects.

4. The method according to claim 3, wherein calculating a matching degree between each contact object in the contact searching result and the input string according to the related information of the matching field comprises:

acquiring the matching field of each contact object in the contact searching result, and acquiring parameters including at least one of a matching location, a matching length and a match rule of the matching field;

determining a corresponding weighting factor for each parameter acquired; and calculating a matching degree between the contact object and the input string according to the parameter acquired and the corresponding weighting factor.

5. The method according to claim 1, wherein, normalizing the input string comprises:

when the input string contains a first non-English character, converting the first non-English character into a corresponding first character set, the first character set being formed by one or more characters contained in the full keyboard;

when the first non-English character has a first adjacent character, inserting a first space between the first character set and the first adjacent character; and obtaining the normalized input string after converting the first non-English character and inserting the first space.

6. The method according to claim 1, wherein obtaining the first string further comprises:

when the contact field contains a second non-English character, converting the second non-English character into a corresponding second character set, the second character set being formed by one or more characters contained in the full keyboard;

when the second non-English character has a second adjacent character, inserting a second space between the second character set and the second adjacent character; and obtaining the first string after converting the second non-English character and inserting the second space for the content of the contact field.

7. The method according to claim 1, further comprising:

displaying content of the matching field on the user interface, when the matching field is obtained due to the normalized input string containing one or more matched character same as the first string of the matching field and when the first string includes a character set converted from a non-English character, displaying the first string associated with the matched field on the user interface, the one or more matched character in the first string being displayed in a highlighted format.

8. A device for searching for a contact object, comprising:

a processor, a memory storing program modules to be executed by the processor, the program modules comprising:

a preprocessing module, configured to normalize contents of contact fields contained in contact objects stored in the memory;

a receiving module, configured to receive an input string for contact object searching from a user interface displayed by the device;

an input processing module, configured to normalize the input string;

a searching module, configured to search in the normalized contents of the contact fields according to the normalized input string, to obtain a matching field; and an acquiring module, configured to acquire information of a contact object containing the matching field as a contact searching result, and display the input string and the contact searching result on the user interface;

wherein normalizing contents of contact fields further comprises: for a first contact field, obtaining a first string corresponding to a content of the first contact field, the first string being formed by characters contained in a full keyboard, wherein the first string includes multiple alphabet characters;

obtaining a second string corresponding to the same content of the first contact field by mapping alphabet characters in the first string to digits according to a designated mapping relation, wherein the designated mapping relation assigns each alphabet character with a single corresponding digit; the second string includes multiple digits corresponding to the multiple alphabet characters; and when the first string further includes a non-alphabet character, the non-alphabet character is unchanged in the second string; and incorporating both the first string and the second string into the normalized contents of the contact fields as corresponding strings for the first contact field, wherein searching in the normalized contents of the contact fields according to the normalized input string further comprises:

respectively matching the first string and the second string with the normalized input string; and when either one of the first string or the second string matches with the normalized input string, determining the first content field as the matching field, such that the first content field can be matched regardless of whether a user input is a digit combination or an alphabet combination.

9. The device according to claim 8, wherein, the searching module is configured to:

search throughout the normalized contents of the contact fields by using the normalized input string as an index, to find a matching field that conforms to a preset match rule;

wherein, the preset match rule includes at least one of a continuous match rule and a non-continuous match rule, and the non-continuous match rule includes a rule for matching the normalized input string with leading-alphabets of character sets in the first string, the character sets being separated by one or more spaces.

10. The device according to claim 8, further comprising:

a sorting module, configured to calculate a matching degree between each contact object in the contact searching result and the input string according to the related information of the matching field, and sort the contact objects in the contact searching result according to the calculated matching degrees, if the contact searching result includes a plurality of contact objects, after the acquiring module acquires the contact searching result; and a displaying module, configured to display the information of the contact objects sorted by the sorting module.

11. The device according to claim 10, wherein, the sorting module is configured to:

acquire the matching field of each contact object in the contact searching result, and acquire parameters including at least one of a matching location, a matching length and a match rule of the matching field;

determine a corresponding weighting factor for each parameter acquired; and calculate a matching degree between the contact object and the input string according to the parameter acquired and the corresponding weighting factor.

12. The device according to claim 8, wherein, the input processing module is configured to:

when the input string contains a first non-English character, convert the first non-English character into a corresponding first character set, the first character set being formed by one or more characters contained in the full keyboard;

when the first non-English character has a first adjacent character, insert a first space between the first character set and the first adjacent character; and obtain the normalized input string after converting the first non-English character and inserting the first space.

13. A non-transitory storage medium containing computer-executable instructions adapted to perform a method for searching for a contact object, wherein the method comprises:

normalizing, by a terminal comprising at least a processor and a memory, contents of contact fields contained in contact objects stored in the memory of the terminal;

receiving an input string for contact object searching from a user interface displayed by the terminal;

normalizing the input string;

searching in the normalized contents of the contact fields according to the normalized input string, to obtain a matching field;

acquiring information of a contact object containing the matching field as a contact searching result; and displaying, by the processor, the input string and the contact searching result on the user interface;

wherein normalizing contents of contact fields further comprises: for a first contact field, obtaining a first string corresponding to a content of the first contact field, the first string being formed by characters contained in a full keyboard wherein the first string includes multiple alphabet characters;

obtaining a second string corresponding to the same content of the first contact field by mapping alphabet characters in the first string to digits according to a designated mapping relation, wherein the designated mapping relation assigns each alphabet character with a single corresponding digit; the second string includes multiple digits corresponding to the multiple alphabet characters; and when the first string further includes a non-alphabet character, the non-alphabet character is unchanged in the second string; and incorporating both the first string and the second string into the normalized contents of the contact fields as corresponding strings for the first contact field, wherein searching in the normalized contents of the contact fields according to the normalized input string further comprises:

respectively matching the first string and the second string with the normalized input string; and when either one of the first string or the second string matches with the normalized input string, determining the first content field as the matching field, such that the first content field can be matched regardless of whether a user input is a digit combination or an alphabet combination.

14. The non-transitory storage medium according to claim 13, wherein, the searching in the normalized contents of the contact fields according to the normalized input string to obtain a matching field comprises:

searching throughout the normalized contents of the contact fields by using the normalized input string as an index, to find a matching field that conforms to a preset match rule;

wherein, the preset match rule includes at least one of a continuous match rule and a non-continuous match rule, and the non-continuous match rule includes a rule for matching the normalized input string with leading-alphabets of character sets in the first string, the character sets being separated by one or more spaces.

15. The non-transitory storage medium according to claim 13, wherein, after acquiring information of a contact object containing the matching field as a contact searching result, the method further comprises:

calculating a matching degree between each contact object in the contact searching result and the input string according to related information of the matching field, if the contact searching result includes a plurality of contact objects; and sorting the contact objects in the contact searching result according to the calculated matching degrees, and displaying the information of the sorted contact objects.

16. The non-transitory storage medium according to claim 15, wherein calculating a matching degree between each contact object in the contact searching result and the input string according to the related information of the matching field comprises:

acquiring the matching field of each contact object in the contact searching result, and acquiring parameters including at least one of a matching location, a matching length and a match rule of the matching field;

determining a corresponding weighting factor for each parameter acquired; and calculating a matching degree between the contact object and the input string according to the parameter acquired and the corresponding weighting factor.

17. The non-transitory storage medium according to claim 13, wherein, normalizing the input string comprises:

when the input string contains a first non-English character, converting the first non-English character into a corresponding first character set, the first character set being formed by one or more characters contained in the full keyboard;

when the first non-English character has a first adjacent character, inserting a first space between the first character set and the first adjacent character; and obtaining the normalized input string after converting the first non-English character and inserting the first space.

* * * * *